March 27, 1956  H. WALTER  2,739,756
TURBO-COMPRESSOR
Filed March 7, 1952  6 Sheets-Sheet 3

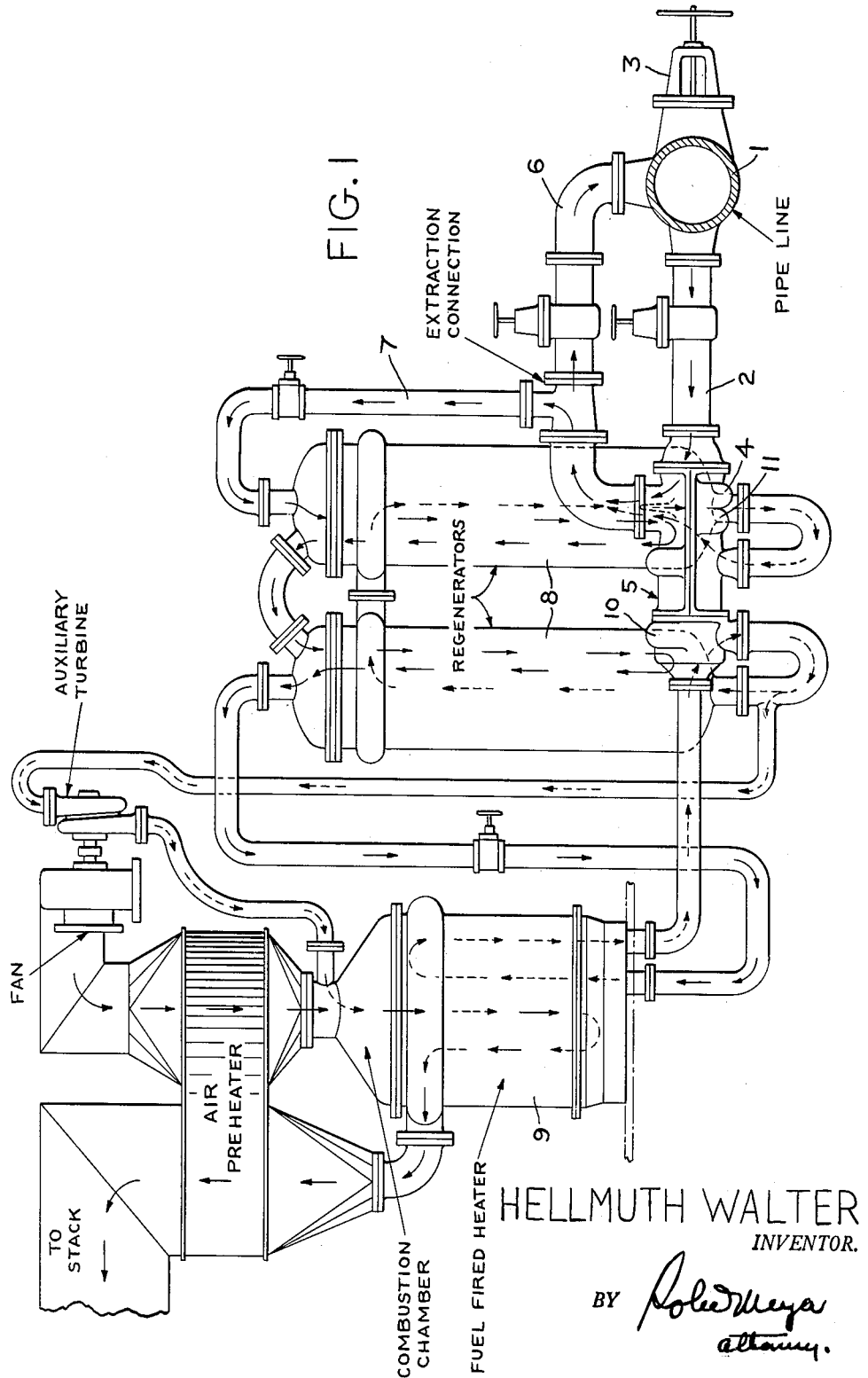

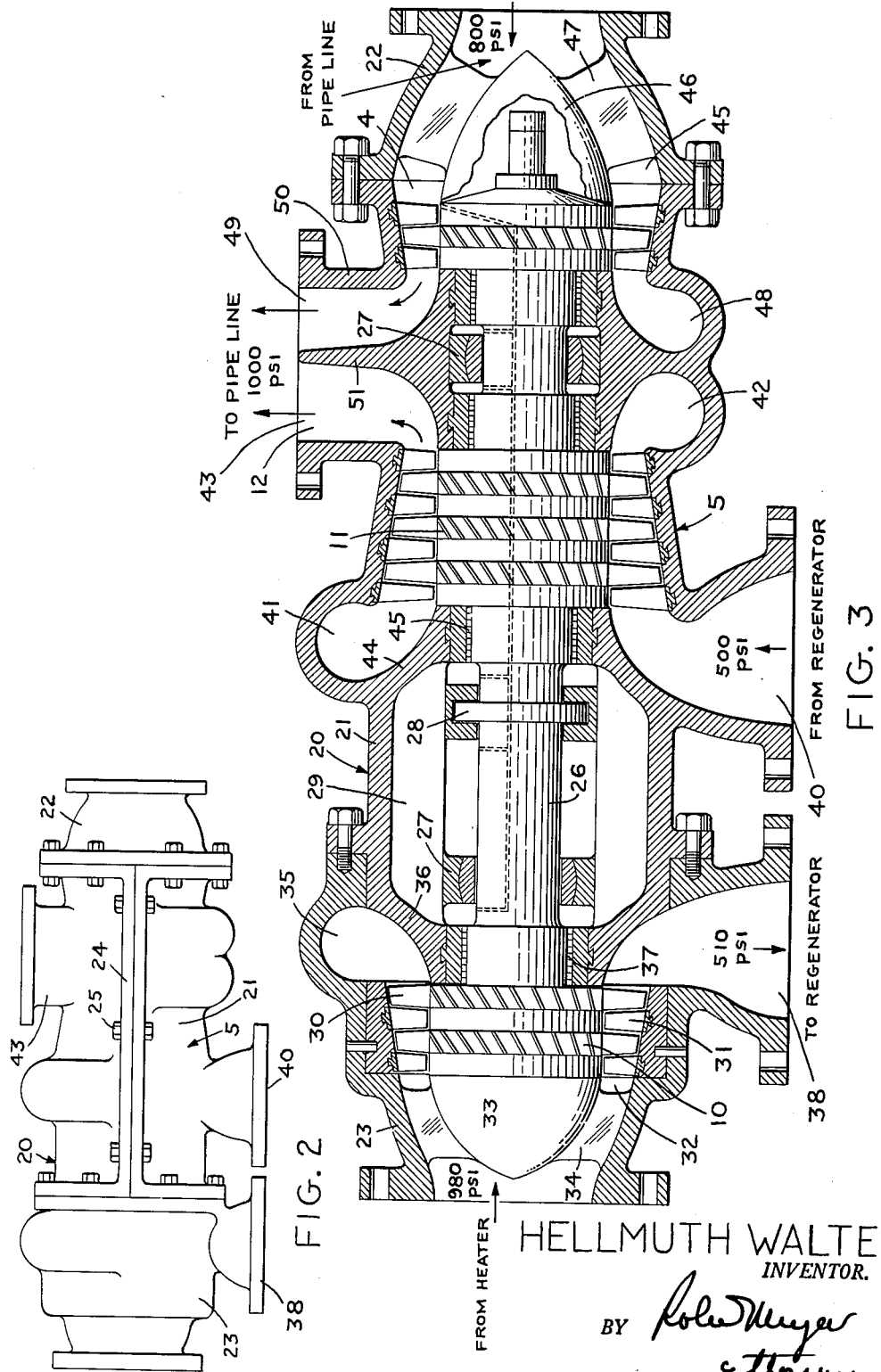

HELLMUTH WALTER
*INVENTOR.*

BY *Robt Meyer*
*attorney*

March 27, 1956  H. WALTER  2,739,756
TURBO-COMPRESSOR
Filed March 7, 1952  6 Sheets-Sheet 4

HELLMUTH WALTER
INVENTOR.

March 27, 1956 — H. WALTER — 2,739,756
TURBO-COMPRESSOR
Filed March 7, 1952 — 6 Sheets-Sheet 5

HELLMUTH WALTER
INVENTOR.
BY [signature]
attorney

March 27, 1956 H. WALTER 2,739,756
TURBO-COMPRESSOR
Filed March 7, 1952 6 Sheets-Sheet 6

HELLMUTH WALTER
*INVENTOR.*

BY *Robt. Meyer*
*attorney*

United States Patent Office 2,739,756
Patented Mar. 27, 1956

2,739,756

TURBO-COMPRESSOR

Hellmuth Walter, Upper Montclair, N. J., assignor to Worthington Corporation, a corporation of Delaware Application March 7, 1952, Serial No. 275,302

9 Claims. (Cl. 230—116)

This invention relates to turbo-compressors and more particularly to a combined turbine and compressor unit particularly adaptable for use in a gas or vapor compressing unit for compressing flowing gas or vapor in an isolated system, wherein the energy required for compression is derived from heating the gases or a part thereof in one or more components of the system; however, the use of the present turbo-compressor is not limited to such particular application but may be employed wherever the use of a turbo-compressor as set forth herein is deemed advantageous or practical.

An object of the present invention is to provide a turbo-compressor, or combined turbine and compressor wherein the turbine and compressing units are enclosed in a totally enclosed single casing, thereby eliminating packing glands or stuffing boxes to the ambient atmosphere; wherein the bearings for the shaft are contained within the central portion of the turbo-compressor casing and are subjected to approximately the minimum pressure in the unit and wherein the portion of the casing enclosing the turbine is substantially barrel-shaped, being free from horizontal splits and flanges in order to avoid distortion and leakage due to temperature variances.

Another object of the present invention is to provide a turbo-compressor which is relatively small and light in weight with consequent low cost of manufacture and installation and one wherein rotational problems are simplified and end thrust is compensated by regulation or routing of the flow paths of the gas or vapor through the turbine and compressor.

A further object of the present invention is to provide a turbo-compressor wherein the gas or vapor enters the unit in an axial direction in order to avoid excessive pressure losses and is distributed in a concentric fashion which affords an even distribution of temperature around the circumference of the unit and minimizes distortion due to uneven expansion and to provide a turbo-compressor, wherein limited leakage of gas being compressed is utilized to maintain a pressure in the central or intermediate section of the turbo-compressor slightly higher than the turbine exhaust pressure in order to prevent hot gases from entering the central or intermediate section of the casing and also is utilized to cool the faces of the turbine wheel.

With these and other objects in view, as may appear from the accompanying specification, the invention consists of various features of construction and combination of parts, which will be first described in connection with the accompanying drawings, showing a turbo-compressor of a preferred form embodying the invention, and the features forming the invention will be specifically pointed out in the claims.

In the drawings—

Figure 1 is a diagrammatic layout of a compressing unit for compressing gas or vapor in an isolated system showing the employment of the improved turbo-compressor.

Figure 2 is a side elevation of one form of the improved turbo-compressor.

Figure 3 is a longitudinal section through the turbo-compressor shown in Figure 1 and showing the rotating elements in elevation.

Figure 7:
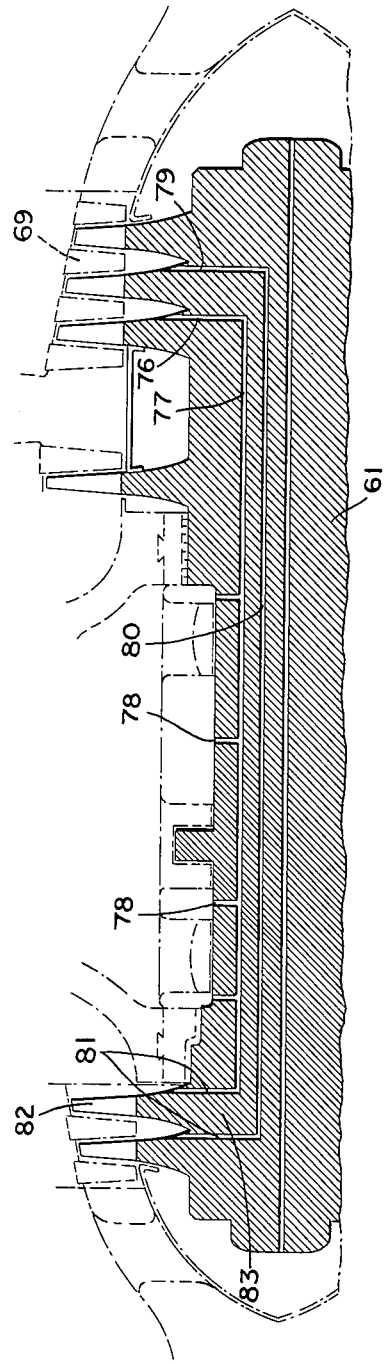
Figure 7 is a fragmentary longitudinal section through the rotating elements of the turbo-compressor shown in Figures 5 and 6.

The turbo-compressor or combined turbine and compressor unit of the present invention is particularly applicable for use in a compressing unit for compressing flowing gas or vapor in an isolated system, wherein, due to pressure losses in the flowing gas or vapor it is desirable to raise the pressure of the flowing gases or vapor to their initial or entrance pressure at the entrance into the system, at spaced stations along the line of flow and in which systems the energy required for compression is derived from heating the gases in one or more components of the compressing unit. Such systems are disclosed in my co-pending applications Serial No. 181,512, filed August 25, 1950, and Serial No. 275,303 filed March 7, 1952. While the turbo-compressor of the present application is particularly adaptable for use in such systems, it is to be understood that its use is not limited thereto but that it may be employed for any use where it is adaptable.

One such system as above referred to is the transmission of natural gas through a pipe line from its source to a distant point of use, wherein in order to keep the size of the pipe within economical limits the gas is pumped through the line at predetermined pressures and the losses in such pressure, due to pipe friction, are replaced by compressing units at spaced stations along the line so as to maintain the gas transmission capacity with pipe of economically small diameter.

Figure 1 of the drawings shows in diagrammatic layout a compressing unit embodying the turbo-compressor of the present invention employed in such a compressing unit wherein the gas flowing through the pipe line 1 is compressed and returned to the line 1 at the raised or increased pressure, part of the compressed gas is extracted and heated and the energy required for compressing the gas is provided by expanding the heated extracted gas through the turbine unit or the turbo-compressor.

The gas from the pipe line 1 enters the compressing unit at approximately 800 p. s. i. (pounds per square inch) through the pipe 2 when the valve 3 is closed. From the pipe 2 the gas flows into the suction of the compressor 4 of the turbo-compressor 5 where its pressure is raised to approximately 1000 p. s. i. in instances where the latter pressure is the desired predetermined pressure of the gas flowing through the line. The compressed gas is returned to the pipe line 1 through the pipe 6. A part of the compressed gas is extracted from that flowing to the pipe line 1 and flows through a pipe 7 to the regenerator or regenerators 8 in which it flows in heat exchange relationship with the extracted gas returning to the pipe line as hereinafter described. The gas which is heated to some extent in the regenerators 8 (shown and described in detail in my co-pending application, Ser. No. 275,304, filed March 7, 1952) then passes to the heater 9 (shown and described in detail in my co-pending application, Ser. No. 275,305, filed March 7, 1952, now Patent No. 2,725,873), where its temperature is further raised. From the heater 9 the heated gas flows to the turbine 10 of the turbo-compressor 5 where the heated gas is expanded through the turbine to provide the energy for driving the compressors. The extracted gas passes from the exhaust of the turbine to and through the regenerators 8 where it gives up some of its heat to the cooler gas flowing through the regenerators 8 from the extraction pipe 7. The gas from the turbine then flows from the regenerators into the compressor 11 of the turbo-compressor 5 where its pressure is again raised to the discharge pressure of the compressor 4. The compressor 11 discharges the gas through its discharge 12 into the pipe 6 and thus back to the pipe line 1.

Figure 4:
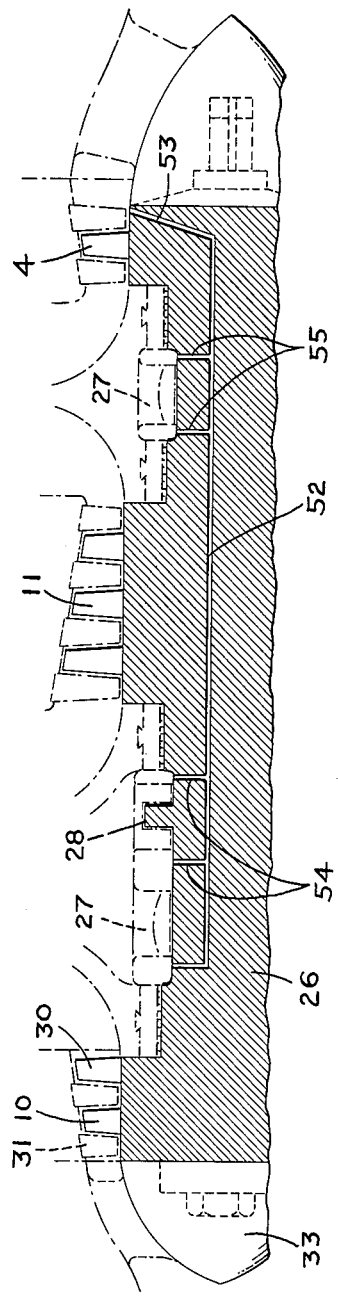
Figure 4 is a fragmentary longitudinal section through the rotating elements of the turbo-compressor shown in Figure 3.

The turbo-compressor shown in Figures 2 to 4 of the drawings includes the casing 20 which is formed of the central or intermediate portion 21 and the end portions 22 and 23. For purposes of convenience in assembly the intermediate portion 21 is split horizontally and the two sections are connected in the usual manner by flanges and bolts indicated at 24 and 25. The end section 22 which forms the inlet section for the gas to be compressed is substantially barrel-shaped, being free from any longitudinal splits and it is attached to the compressor end of the intermediate section 21 by the usual type of flanges and bolts. The end section 23 of the casing 20 is also free from any longitudinal splits being substantially what is known as a barrel-shaped casing or section. This end section 23 encloses the turbine 10 and has no horizontal splits in order to avoid distortion of the casing under heat variances and consequent heatings. The section 23 is connected to the intermediate section 21 by the usual type of flanges and bolts.

The rotating shaft 26 of the turbo-compressor is supported by suitable bearings 27 and end thrust is balanced by a thrust bearing indicated at 28 which may be of any suitable type. The bearings 27 and 28 are totally enclosed within the intermediate section 21 of the casing 20 and an annular chamber 29 is formed in the intermediate section of the casing about certain of the bearings. The shaft 26 projects into the end section 23 of the casing 20 and has the rotary elements 30 of the turbine mounted thereon which cooperate with the stationary elements 31 of the turbine carried by the casing section 23. The inlet of the hot gas from the heater 9 to the turbine 10 is axially through the outer end of the section 23 and the hot gases are directed through an annular circular passageway 32 to the turbine 10 by a streamlined or projectile-shaped element 33 supported within the casing section 23 inwardly of its inlet by suitable ribs 34. The turbine 10 discharges into an annular discharge passage 35 which is isolated from the chamber 29 by the web or partition 36 formed on the intermediate section 21 of the casing 20 and by means of the seals 37 surrounding the shaft 26 inwardly of the turbine 10. The hot gases flow from the annular turbine outlet 35 through the radial outlet 38 to the regenerators 8 and from the regenerators the gases enter the inlet 40 into the annular inlet passage 41 of the compressor 5 where the gas is compressed by approximately 500 p. s. i., its pressure after expansion through the turbine 10 to approximately 1000 p. s. i., or the pressure which it is desired to maintain in the pipe line. The compressor 11 discharges into an annular discharge passage 42 which in turn discharges through the radial outlet 43 or 12. The radial inlet passage 41 of the compressor 11 is isolated from the chamber 29 by the web 44 and the seals 45, the latter of which are about the shaft 26. The gas discharged by the compressor 11 flows through the outlet 12 into the pipe 6 where it mingles with the gas which has been compressed by the compressor 4. The compressor 4 is mounted in the end of the intermediate section 21 of the casing 20 opposite to the end at which the turbine 10 is mounted and the gas from the pipe line 1 enters axially into the outer end of the section 22 of the casing and is directed through an annular diverging passageway 45 to the suction of the compressor 4. The passage 45 is formed by a streamlined or projectile-shaped element 46 supported in the casing section 22 by suitable ribs 47. The gas which is compressed in the compressor 4 exhausts therefrom into an annular discharge passage 48 and passes through the radial outlet 49 into the pipe 6 where it mingles with the gas discharged from the compressor 11 and is returned to the pipe line 1 downstream of the valve 3. As shown in the drawings, the discharge openings or passages 43 and 49 are formed in a single cast extension 50 being separated one from the other by suitable partition or webbing 51. One of the bearings 27 of the shaft 26 is supported by the webbing 51 and is consequently located between the compressors 4 and 11.

Pressure is maintained in the chamber 29 slightly in excess of the discharge pressure of the turbine 10 by extracting gas from the compressor 4 at a point near the suction of the compressor through a passage 52 extending longitudinally in the shaft 26, a radial passage 53 opening into the compression space of the compressor 4 and a plurality of radial passages 54 opening into the chamber 29. The bearing 27 located between the compressors 4 and 11 is cooled and pressurized for proper lubrication thereof by one or more radial passages 55 which communicate with the longitudinally extending passage 52.

Figure 5:
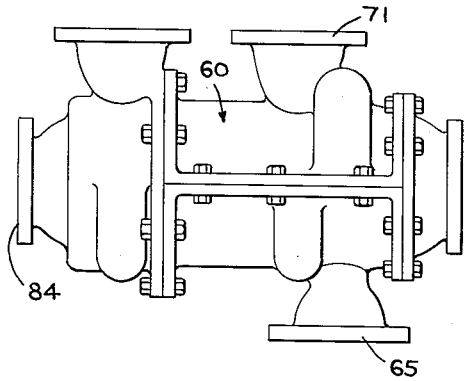
Figure 5 is a side elevation of another form of the turbo-compressor.
Figure 6:
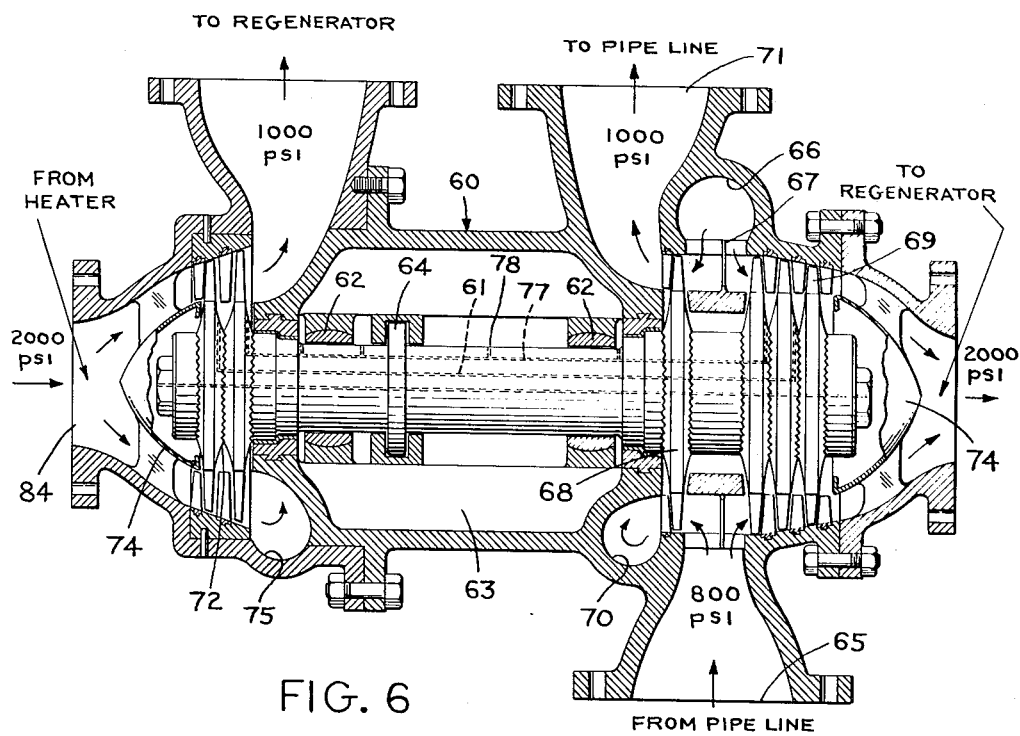
Figure 6 is a longitudinal section through the form of turbo-compressor shown in Figure 5 and showing the rotating elements in elevation.

The turbo-compressor shown in Figures 2 to 4 inclusive is adaptable for use in a compressing unit the cycle of which is known as a step-up-down cycle wherein when the cycle of the compressing unit pressure of the gas is first raised by the compressor 4 to the desired line pressure, a part of the gas is extracted at this raised pressure for use in the cycle of the compressing unit and in the cycle of the compressing unit the gas at slightly lower pressure due to its passage through the regenerators, heater, and pipes but at still a high pressure and high temperature enters the turbine, where it is expanded down to the low pressure of the system and has its pressure again raised by the compressor 11 to the high or discharge pressure. In Figures 5 and 6 of the drawings a turbo-compressor is illustrated adaptable for use in a system similar to that shown in Figure 1 of the drawings except that the pressure of the gas which is used in the cycle of the compressing unit for providing the energy of compression is raised above the discharge pressure to the pipe line as it is delivered to the cycle or compressing system.

The form of compressor shown in Figures 5 and 6 embodies a casing 60 which is constructed in the same manner as the casing 20 of the compressor shown in Figures 2 and 3 of the drawings and it has the rotating shaft 61 wholly enclosed within the casing and supported by bearings 62 which are mounted in the chamber 63 located in the intermediate section of the casing 60. A suitable thrust bearing 64 of any suitable construction is also located in the chamber 63.

The gas from the pipe line enters the turbo-compressor through the inlet 65 into an annular inlet passage 66 and it is directed by suitable direction vane 67 partly into the compressor 68 and partly into the compressor 69. As shown in Figure 6 of the drawings, the greater portion of the entering gas passes into the compressor 68 where its pressure is raised from the pressure in the line at the point of its delivery to the turbo-compressor to the higher temperature which it is desired to maintain downstream of the valve 3. The compressor 68 discharges into an annular discharge passage 70 and from thence to the outlet 71 back to the pipe line downstream of the control valve therein. The gas which is delivered to the compressor 69 has its pressure raised to a much higher degree. As indicated in Figure 6 of the drawings approximate pressures are an entrance pressure of 800# p. s. i., a discharge pressure from the compressor 68 of 1000# p. s. i. and a discharge pressure from the compressor 69 of 2000# p. s. i. The compressor 69 discharges the gas which is extracted from the major portion of the gas and passes through the compressor 69 to the regenerators from the regenerators to the heater so that the heated gas enters the turbo-compressor unit at the turbine end thereof at approximately 2000# p. s. i. and is expanded through the turbine 72 down to approximately 1000# p. s. i. from which it passes to the regenerator or regenerators in which it gives up some of its heat to the gas flowing through the regenerators from the compressor 69 and from the regenerator the gas expanded in the turbine flows to the pipe line downstream of its control valve.

Like in the turbo-compressor shown in Figures 2 and 3 of the drawings the turbine 72 is placed at one end of the turbo-compressor with the compressors 68 and 69 located at the other end and the flow of gas to the turbine and from the compressor 69 are through annular passageways formed by streamline or projectile-shaped elements 74 and the chamber 63 is isolated from the annular discharge passage 75 of the turbine and the annular discharge passage 70 of the compressor 68. Pressure is maintained in the chamber 63 slightly in excess of the discharge pressure from the turbine 72 by means of gas bled from a point in the compressor 69 through suitable radial openings 76, a longitudinal passage 77 in the shaft 61 and radial passages 78 which lead into the chamber 63 as clearly shown in the fragmentary section of Figure 7 of the drawing. The turbine wheel is cooled by gas bled from an intermediate stage of the compressor 69 through radial passages 79 a longitudinal passage 80 formed in the shaft 61 and radial passages 81 which open out through the turbine hub to the spaces between the blades 82 of the turbine wheel. As clearly shown in Figures 6 and 7 of the drawings, the turbine wheel 83 and the rotative elements of the compressors 68 and 69 are all mounted on the shaft 61 and all rotative parts are within the totally enclosed casing 60 so that no stuffing boxes, packing or seals to the outside of the casing are necessary, which is also true of the construction of the compressor shown in Figures 2 and 3 of the drawings. It is also to be noted in both of the forms of the compressors shown as well as in the other forms to be hereinafter described that axial openings are provided in the ends of the casing and that the pressure of the gases flowing through these axial openings is approximately the same, thus minimizing end thrust pressures on the rotative elements and providing proper temperature distribution of the gases within the casing. In the compressor shown in Figures 5 and 6 of the drawings the inlet 84 to the turbine 72 is axial and the outlet of the compressor 69 from the casing 60 is axial.

Figure 8:
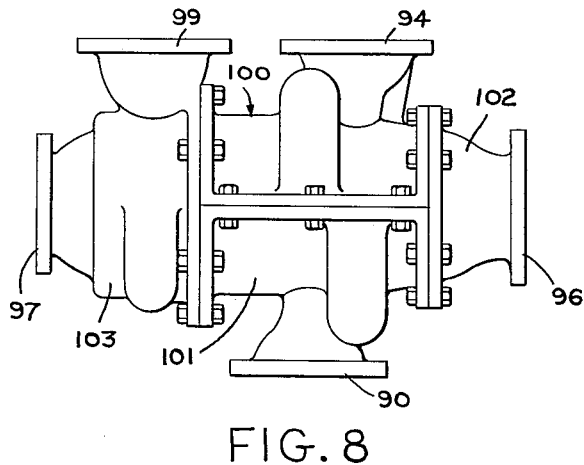
Figure 8 is a side elevation of still another form of the turbo-compressor.
Figure 9:
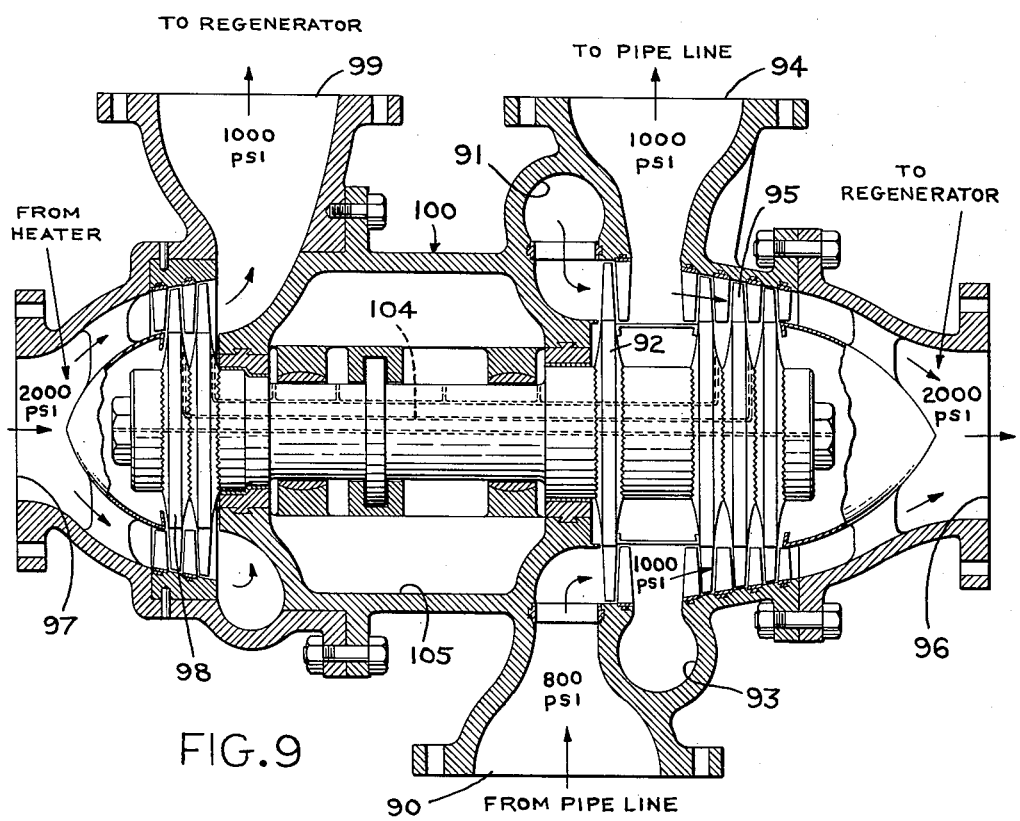
Figure 9 is a longitudinal section through the form of the turbo-compressor shown in Figure 8 and showing the rotating elements in elevation.

The form of the compressor shown in Figures 8 and 9 is quite similar to the form of the turbo-compressor shown in Figures 5 and 6 of the drawings. It differs therefrom in the passages relative to the two compressors enclosed within the casing.

In the construction of the turbo-compressor shown in Figures 8 and 9 the gas enters from the pipe line through the inlet 90 into the annular inlet passage 91 within the casing and from the annular inlet passage 91 all of the gas flows to the compressor 92 and is compressed thereby. The gas is discharged from the compressor 92 into an annular discharge passage 93 and from the annular discharge passage 93 the majority of the gas compressed by the compressor is returned to the pipe line downstream of the control valve thereof through an outlet 94. Part of the gas, however, that is, the gas which is extracted and used in the cycle of the compressing unit wherein it is heated to provide the energy for driving the compressors passes from the annular discharge passage 93 into the compressor 95 where its pressure is raised and it is discharged through the axial outlet 96 to the regenerator of the compressing unit and from which it eventually passes through the axial inlet 97 of the turbine 98 where it is expanded down to approximately the discharge line pressure and discharges through the outlet 99 back to the regenerators and therethrough to the pipe line downstream of its control valve.

The casing 100 of the compressor shown in Figures 8 and 9 is substantially the same as the casings 20 and 60, being formed of a split intermediate section 101 and two substantially barrel-shaped end sections 102 and 103. It differs from the casings 20 and 60 only in the location of the radial inlet 90 and radial outlets 94 and 99 and the location of the annular suction passage 91. The shaft 104, as are the rotative elements of the turbine and compressors, is totally enclosed within the enclosed casing 100 and pressure is maintained between the compressor 92 and the turbine 98 in the chamber 105 and the turbine wheels are cooled by the passage of compressed gas extracted from stages of the compressor 95 and flowing through suitable passages in the shaft 104 to the chamber 105 and through the turbine wheel 98.

Figure 10:
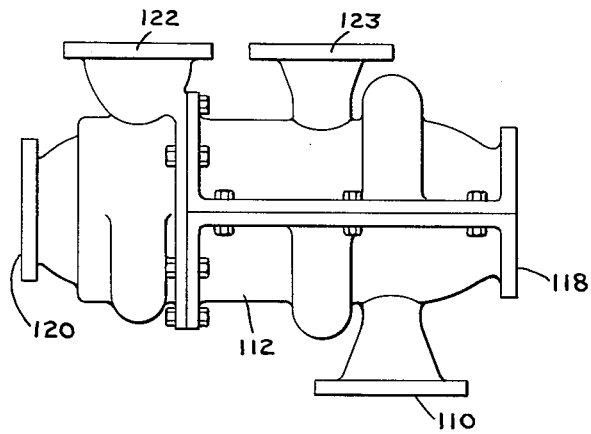
Figure 10 is a side elevation of a modified form of the turbo-compressor.
Figure 11:
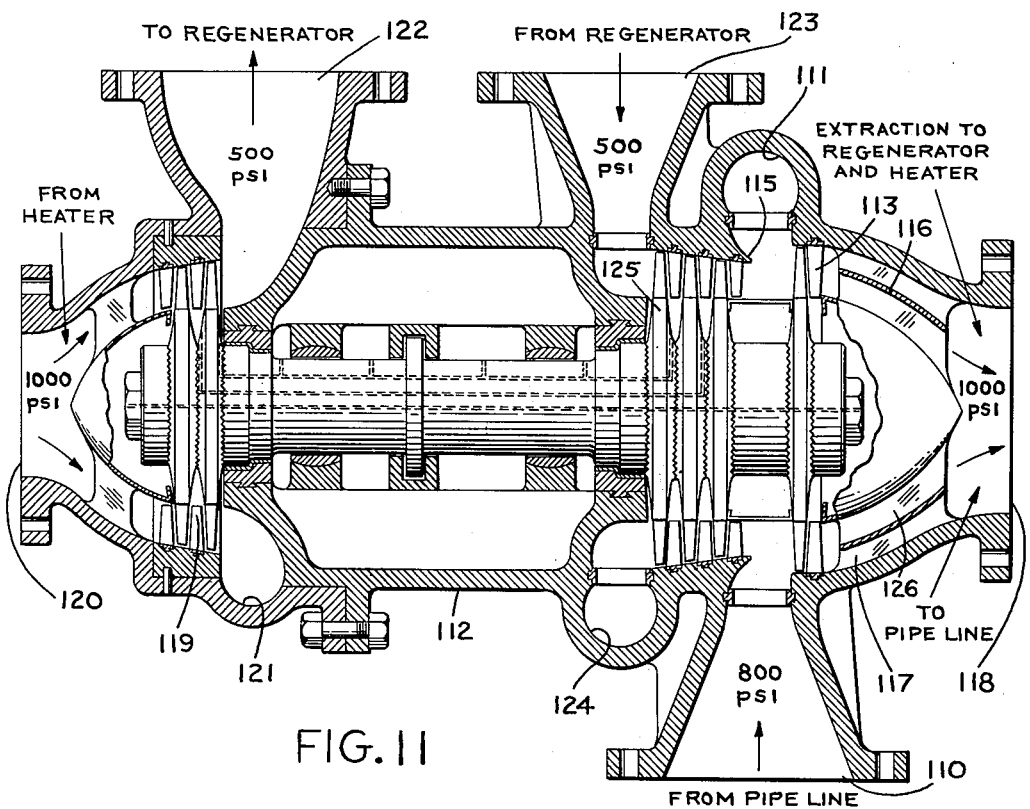
Figure 11 is a longitudinal section through the form of turbo-compressor shown in Figure 10 and showing the rotating elements in elevation.

The form of the turbo-compressor shown in Figures 10 and 11 of the drawings is in major respects of construction similar to the turbo-compressors of Figures 5 to 10 inclusive. However, it differs in construction from these compressors due to the fact that different flow passages and arrangement of flow of the gases through the compressor elements of the turbo-compressor is provided.

In the form of turbo-compressor shown in Figures 10 and 11 of the drawings, the cold gas from the pipe line is introduced at the bottom of the casing through the inlet 110 into the annular inlet passage 111 formed in the casing 112 and from the annular inlet passage 111 the gas flows to the compressor 113 where it is compressed and its pressure raised to the pressure desired in the downstream side of the pipe line. The compressor 113 is used both for the compression of the gas entering from the pipe line and for the final stage of recompression of the gas which is circulated through the compressing unit and is employed for supplying the energy of compression, and the casing 112 has an annular flow directing abutment 115 thereon which directs the incoming cool gas from the pipe line towards the outer peripheral portion of the rotary element of the compressor 113 and thus the comparatively cool gas is compressed in the outer periphery of the compressor in order to keep the casing 112 as cool as possible and to make extraction of part of the gas for circulation through the compressing unit comparatively easy. Circulation of part of the gas compressed by the compressor 113 is provided by means of a circumferential vane 116 located in the annular or circumferential discharge passage 117 from the compressor 113 to the axial outlet 118. The smaller portion of the gas compressed by the compressor 113 which is extracted for use in the compressing unit flows from the outlet 118 through the regenerator, and heater of the compressing unit and to the turbine 119 through the axial inlet 120. From the turbine 119 the expanded gas flows into the annular discharge passage 121, from the discharge passage 121 through the radial outlet 112 to the regenerator or regenerators returning from these elements of the compressing unit through the radial inlet 123 to the annular inlet passage 124 of the compressor 125. The gas is compressed in the compressor 125 to approximately the same pressure at which the pressure gas enters the turbo-compressor through the inlet 110 and is discharged from the compressor 125 into the inlet of the compressor 113 where it is further compressed and discharged from the compressor 113 through the inner portion 126 of the annular outlet 117 to the axial outlet 118 from whence it is returned to the pipe line downstream of the control valve therein. The compressor structure shown in Figures 10 and 11 of the drawings includes an enclosed casing 112 and all of the other features of construction of the other forms of the turbo-compressor hereinabove described.

It will be understood that the invention is not to be limited to the specific construction or arrangement of parts shown, but that they may be widely modified within the invention defined by the claims.

What is claimed is:

1. In a turbo-compressor, a casing comprising an intermediate horizontally split section, and end sections each formed of one piece free from longitudinal splits, a shaft supported wholly within said casing, a turbine on one end of said shaft, a compressor on the other end of said shaft, said casing having an axial inlet at one end thereof for high pressure gas flowing to the turbine and an axial outlet at the other end of the casing for high pressure gas discharged by the compressor, said casing having a radial outlet for expanded gas from the turbine and a radial inlet for gas to the compressor, said casing having annular passages therein for the flow of gas to and from the turbine and to and from the compressor whereby gases are distributed in a concentric pattern within the shell to afford an even distribution of temperature around the circumference of the shell, said radial inlets and said radial outlets opening radially into said annular passages.

2. In a turbo-compressor, a casing comprising an intermediate horizontally split section, and end sections each formed of one piece free from longitudinal splits, a shaft supported wholly within said casing, a turbine on one end of said shaft, a compressor on the other end of said shaft, said casing having an axial inlet at one end thereof for high pressure gas flowing to the turbine and an axial outlet at the other end of the casing for high pressure gas discharged by the compressor, said casing having a radial outlet for expanded gas from the turbine and a radial inlet for gas to the compressor, said casing having annular passages therein for the flow of gas to and from the turbine and to and from the compressor whereby gases are distributed in a concentric pattern within the shell to afford an even distribution of temperature around the circumference of the shell, said radial inlets and said radial outlets opening radially into said annular passages, an isolated chamber formed within said casing between said turbine and said compressor, said shaft having a passage therein the inlet of which opens at a predetermined pressure point in said compressor and the outlet of which passage opens into said chamber to provide a pressure in the chamber in excess of the discharge pressure of said turbine.

3. In a turbo-compressor, an enclosed casing, a shaft wholly enclosed in said casing, a turbine on one end of said shaft, a first compressor on the other end of said shaft, a second compressor on said shaft between said turbine and said first compressor, said compressors including rotatable compressing wheels, said casing having an annular inlet passage therein for gas to be compressed by said first compressor, means on said casing extending into said annular inlet passage to direct gas from the inlet passage to the outer peripheral portion of the rotatable compressing wheel of said first compressor, said second compressor discharging into said annular inlet passage, said gas directing means on said shell directing the discharge of the second compressor across said annular inlet passage to the inner peripheral portion of the rotating wheel of the first compressor said casing having an axial outlet for compressed gas.

4. A turbo-compressor as claimed in claim 3 wherein said casing has annular passages therein for the flow of gas to and from the turbine and to and from the compressors whereby gases are directed in a concentric passage within the shell to afford an even distribution of temperature around the circumference of the shell.

5. In a turbo-compressor, an enclosed casing, a shaft wholly enclosed in said casing, a turbine on one end of said shaft, a first compressor on the other end of said shaft, a second compressor on said shaft between said turbine and said first compressor, said compressors including rotatable compressing wheels, said casing having an annular inlet passage therein for gas to be compressed by said first compressor, means on said casing extending into said annular inlet passage to direct gas from the inlet passage to the outer peripheral portion of the rotatable compressing wheel of said first compressor, said second compressor discharging into said annular inlet passage, said gas directing means on said shell directing the discharge of the second compressor across said annular inlet passage to the inner peripheral portion of the rotating wheel of the first compressor, said casing having an axial outlet for gas compressed by said first compressor, means in said casing forming an annular discharge passage from said first compressor to said axial outlet, and an annular partition in said annular discharge outlet to stratify the gas compressed by the outer peripheral portion of the compressor wheel and the gas compressed by the inner peripheral portion of the compressor wheel during passage through said annular discharge passage.

6. A turbo-compressor as claimed in claim 5 wherein said shaft has a passage therein the inlet of which opens at a predetermined pressure point in said compressor and the outlet of which passage opens into the turbine to provide gas under pressure for cooling the wheel of the turbine.

7. In a turbo-compressor, an enclosed casing, a shaft wholly enclosed in said casing, a turbine on one end of said shaft, a first compressor on the other end of said shaft, a second compressor on said shaft between said turbine and said first compressor, said compressors including rotatable compressing wheels, said casing having an annular inlet passage therein for gas to be compressed by said first compressor, means on said casing extending into said annular inlet passage to direct gas from the inlet passage to the outer peripheral portion of the rotatable compressing wheel of said first compressor, said second compressor discharging into said annular inlet passage, said gas directing means on said shell directing the discharge of the second compressor across said annular inlet passage to the inner peripheral portion of the rotating wheel of the first compressor, said casing having an axial outlet for gas compressed by said first compressor, means in said casing forming an annular discharge passage from said first compressor to said axial outlet, said casing having an axial inlet for gas to the turbine at the end thereof opposite the axial outlet for gas compressed by said first compressor.

8. In a turbo-compressor, an enclosed casing, a shaft wholly enclosed in said casing, a turbine on one end of said shaft, a first compressor on the other end of said shaft, a second compressor on said shaft between said turbine and said first compressor, said compressors including rotatable compressing wheels, said casing having an annular inlet passage therein for gas to be compressed by said first compressor, means on said casing extending into said annular inlet passage to direct gas from the inlet passage to the outer peripheral portion of the rotatable compressing wheel of said first compressor, said second compressor discharging into said annular inlet passage, said gas directing means on said shell directing the discharge of the second compressor across said annular inlet passage to the inner peripheral portion of the rotating wheel of the first compressor, said casing having an axial outlet for gas compressed by said first compressor, means in said casing forming an annular discharge passage from said first compressor to said axial outlet, said casing having an axial inlet for gas to the turbine at the end thereof opposite the axial outlet for gas compressed by said first compressor, and means for delivering gas from a predetermined point in said second compressor against the turbine to cool the wheel of the turbine.

9. In a turbo-compressor, an enclosed casing, a shaft wholly enclosed in said casing, a turbine on one end of said shaft, a first compressor on the other end of said shaft, a second compressor on said shaft between said turbine and said first compressor, said compressors including rotatable compressing wheels, said casing having an annular inlet passage therein for gas to be compressed by said first compressor, means on said casing extending into said annular inlet passage to direct gas from the inlet passage to the outer peripheral portion of the rotatable compressing wheel of said first compressor, said second compressor discharging into said annular inlet passage, said gas directing means on said shell directing the discharge of the second compressor across said annular inlet passage to the inner peripheral portion of the rotating wheel of the first compressor, said casing having an axial outlet for gas compressed by said first compressor, means in said casing forming an annular discharge passage from said first compressor to said axial outlet, said casing having an axial inlet for gas to the turbine at the end thereof opposite the axial outlet for gas compressed by said first compressor, an isolated chamber formed within said casing between said turbine and said second compressor, said shaft having a passage therein the inlet of which opens out at a predetermined pressure point in said second compressor and the outlet of which opens into said isolated chamber to provide a pressure in said chamber in excess of discharge pressure of the turbine.

References Cited in the file of this patent

UNITED STATES PATENTS

| | | |
|---|---|---|
| 1,287,367 | Loewenstein | Dec. 10, 1918 |
| 1,993,963 | Heinze | Mar. 12, 1935 |
| 2,046,737 | Gosslau | July 7, 1936 |
| 2,161,517 | Keller | June 6, 1939 |
| 2,316,452 | Pfenninger | Apr. 13, 1943 |
| 2,322,824 | Buchi | June 29, 1943 |
| 2,356,557 | Anxionnax et al. | Aug. 22, 1944 |
| 2,399,046 | Larrecq | Apr. 23, 1946 |
| 2,401,826 | Halford | June 11, 1946 |
| 2,492,672 | Wood | Dec. 27, 1949 |
| 2,577,179 | Buchi | Dec. 4, 1951 |
| 2,579,049 | Price | Dec. 18, 1951 |

FOREIGN PATENTS

| | | |
|---|---|---|
| 182,748 | Great Britain | Sept. 5, 1921 |
| 636,936 | Germany | Oct. 17, 1936 |
| 675,882 | Germany | May 20, 1939 |